United States Patent [19]

Oku

[11] Patent Number: 4,630,649
[45] Date of Patent: Dec. 23, 1986

[54] GUIDE TUBE FOR INDUSTRIAL ENDOSCOPE

[75] Inventor: Toshio Oku, Tokyo, Japan

[73] Assignee: Kabushiki Kaisha Machida Seisakusho, Tokyo, Japan

[21] Appl. No.: 727,545

[22] Filed: Apr. 26, 1985

[30] Foreign Application Priority Data

May 2, 1984 [JP] Japan .................. 59-64483[U]

[51] Int. Cl.⁴ .................................. F16L 55/00
[52] U.S. Cl. ...................... 138/122; 15/104.3 SN; 128/4
[58] Field of Search ................. 138/119–122, 138/131, 135; 15/104.3 SN, 104.3 R, 257 R; D32/14; 128/3–8; 356/241

[56] References Cited

U.S. PATENT DOCUMENTS

| | | | |
|---|---|---|---|
| 1,913,390 | 6/1933 | Hungerford | 138/135 |
| 2,056,840 | 10/1936 | Collom | 138/135 |
| 2,417,676 | 3/1947 | Chernack | 138/131 |
| 2,468,490 | 4/1949 | Joseph | 15/104.3 SN |
| 2,509,115 | 5/1950 | Wait et al. | 15/104.3 SN |
| 2,797,683 | 7/1957 | Aiken | 128/6 |
| 2,973,537 | 3/1961 | Simpson | 15/104.3 R |
| 3,687,169 | 8/1972 | Reynard | 138/135 |
| 3,724,922 | 4/1973 | Jones | 356/241 |
| 3,771,570 | 11/1973 | Coleman | 138/131 |
| 3,957,084 | 5/1976 | Jung | 138/122 |
| 3,959,840 | 6/1976 | Sato | 15/104.3 SN |
| 3,971,544 | 7/1976 | Smith, Jr. | 15/104.3 SN |
| 4,146,034 | 3/1979 | Gupta . | |
| 4,254,762 | 3/1981 | Yoon | 128/4 |
| 4,326,561 | 4/1982 | Kutnyak | 138/129 |
| 4,377,188 | 3/1983 | Siegwart | 138/122 |

FOREIGN PATENT DOCUMENTS 565947 11/1958 Canada .................. 15/104.3 SN
3201505 12/1982 Fed. Rep. of Germany ..... 15/104.3 SN Primary Examiner—Stephen Marcus
Assistant Examiner—Leo James Peters
Attorney, Agent, or Firm—Kane, Dalsimer, Kane Sullivan and Kurucz

[57] ABSTRACT

A guide tube for guiding the movement of an endoscope into a passageway includes a tubular body having a front end slanted with respect to an axis thereof. At least that portion of the tubular body adjacent to said front end is axially compressible resiliently and resiliently bendable.

3 Claims, 15 Drawing Figures

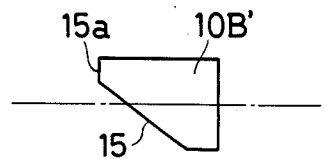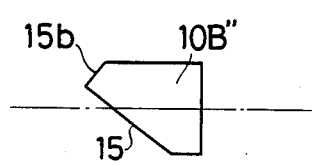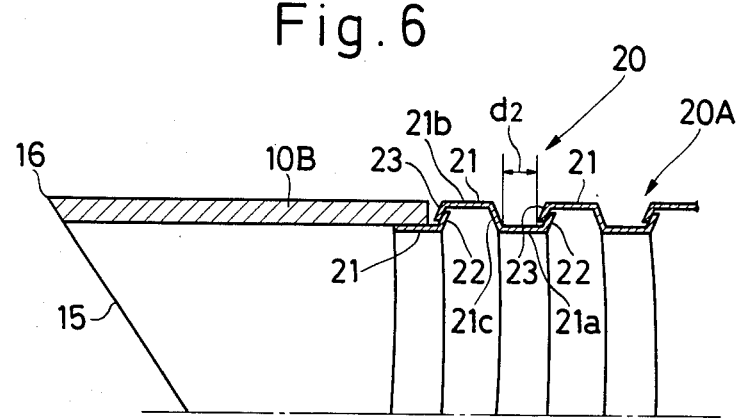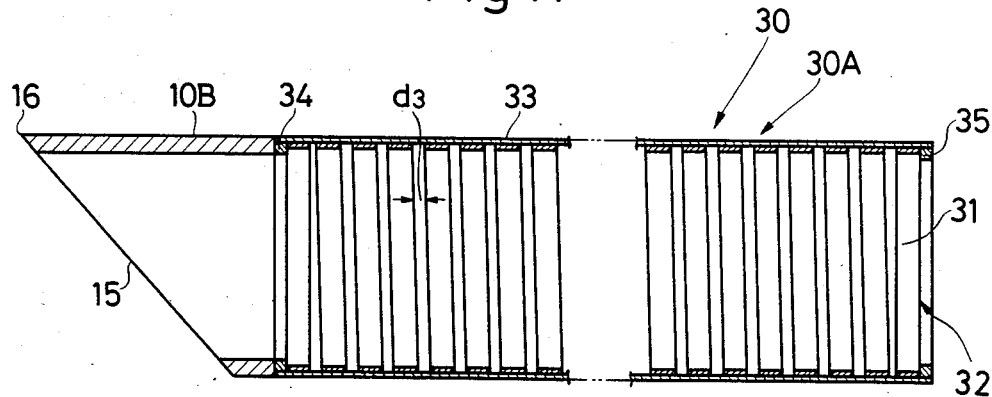

GUIDE TUBE FOR INDUSTRIAL ENDOSCOPE

BACKGROUND OF THE INVENTION

1. Field of the Invention

This invention relates to a guide tube for guiding the movement of an insertion tube of an industrial endoscope into a passageway of an object to be inspected.

2. Prior Art

In the case where a passageway of an object, such as a sewer, to be inspected by an industrial endoscope is turned at right angles or branched, it is difficult to insert an insertion tube of the endoscope into the passageway without any guide. The reason is that the insertion tube must have a sufficient rigidity not to be axially compressed easily so that it can be advanced along the passageway in response to a push, and therefore the insertion tube of such a rigidity is subjected to much resistance when passing through bent and branched portions of the passageway.

For this reason, a guide tube has heretofore been used for guiding the movement of the insertion tube of the endoscope into the passageway. The manner in which the insertion tube is inserted into the passageway with the aid of the guide tube will now be described with reference to FIGS. 13 to 15. The guide tube 60 is first inserted into a straight passageway 101 of an object 100 to be inspected, and then the insertion tube 51 of the endoscope 50 is inserted into the guide tube 60. The guide tube 60 is so flexible as to be bent but has such a rigidity as to withstand an axial compression. The passageway 101 is divided into branch passageways 101a and 101b at a T-shaped branch portion 102. The insertion tube 51 is advanced along the guide tube 60 until its front end 54 reaches the branch portion 102 beyond the front end of the guide tube 60. The endoscope 50 comprises a thumb nut 53 rotatably mounted on a body 52 and an operating wire (not shown) extending into the insertion tube 51 and operatively coupled to the thumb nut 53 and the front end 54. Upon rotation of the thumb nut 53, the front end 54 is bent via the operating wire. The front end 54 is bent toward the branch portion 101a by manipulating the thumb nut 53 as shown in FIG. 13. Then, as shown in FIG. 14, the guide tube 60 is pushed until its front end passes beyond the bent front end 54 of the insertion tube 51 and introduced into the branch passageway 101a. Then, as shown in FIG. 14, the insertion tube 51 is pushed until the front end 54 passes beyond the bent front end of the guide tube 60. At this time, since the front end of the guide tube 60 is bent, the insertion tube 51 can be smoothly advanced.

However, as described above, the guide tube 60 has a sufficient rigidity to withstand an axial compression, and besides its front end is not designed to be bent without any guide toward the direction in which the guide tube is to be advanced. Therefore, the guide tube 60 can not be passed through the branch portion 102 by itself. For this reason, it is necessary to first extend the front end 54 of the insertion tube 51 beyond the front end of the guide tube 60 at the branch portion 102 and then to bend the front end 54 to guide the guide tube 60 toward the branch 101a. This operation is cumbersome. In addition, when the guide tube 60 passes through the branch portion 102, it tends to scratch the outer surface of the bent front end 54 of the insertion tube 51 and the outer surface of that portion of the insertion tube 51 adjacent to the bent front end 54, thereby causing damage thereto.

SUMMARY OF THE INVENTION

It is therefore an object of this invention to provide a guide tube for an endoscope by which the insertion tube of the endoscope can be easily passed through branched and bent portions of the passageway without any damage to the outer surface thereof.

According to the present invention, there is provided a guide tube for guiding the movement of an endoscope into a passageway which comprises a tubular body having a front end slanted with respect to an axis thereof, at least that portion of the tubular body adjacent to the front end being axially compressible resiliently and resiliently bendable.

BRIEF DESCRIPTION OF THE DRAWINGS

FIGS. 4 and 5 are schematic side-elevational views of modified end members of the guide tube, respectively;

FIG. 6 is a fragmentary cross-sectional view of another modified guide tube;

FIG. 7 is a cross-sectional view of a further modified guide tube;

DESCRIPTION OF THE PREFERRED EMBODIMENTS OF THE INVENTION

Figure 1:
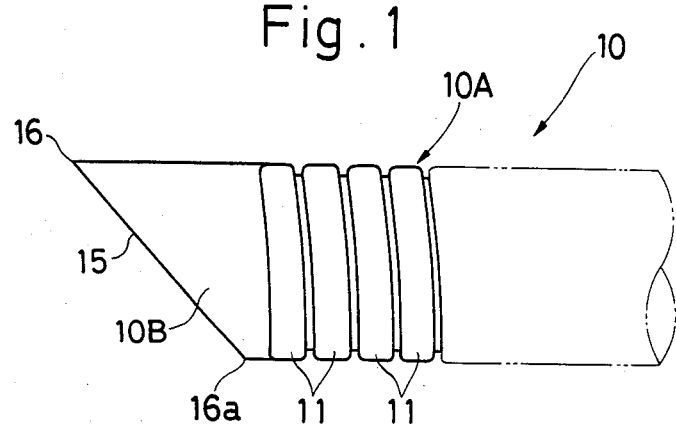
FIG. 1 is a fragmentary side-elevational view of a guide tube provided in accordance with the present invention.
Figure 2:
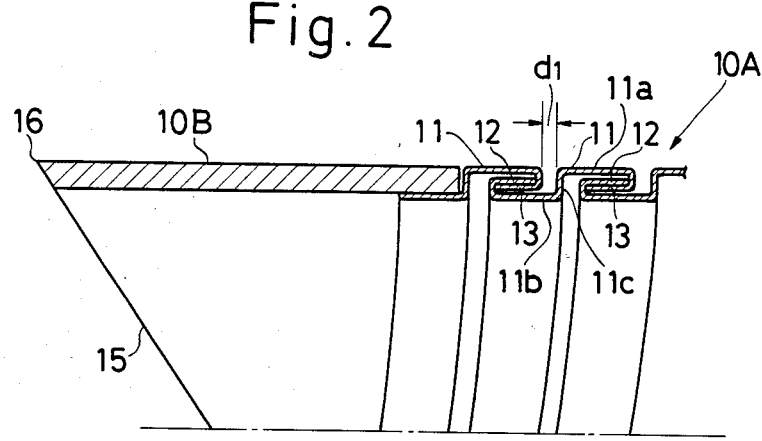
FIG. 2 is a fragmentary cross-sectional view of the guide tube.

A guide tube 10 shown in FIGS. 1 and 2 comprises a tubular body 10A and a tubular end member 10B secured to a front end of the body 10A. The tubular body 10A is made of a metal strip 11 formed into a spiral configuration, and the metal strip is of a generally S-shaped cross-section and has a pair of U-shaped engaging portions 12 and 13 formed along opposite lateral edges thereof. The S-shaped strip 11 has first and second portions 11a and 11b of a hook shape and a connective portion 11c interconnecting the first and second hook portions 11a and 11b, the first and second hook portions 11a and 11b being disposed symmetrically with respect to a central point of the connective portion 11c. The hook portions 11a and 11b provide the engaging portions 12 and 13, respectively. The engaging portions 12 and 13 of each adjacent turns of the spiral strip 11 are engaged with each other.

The body 10A is of such a construction that when it is compressed axially, it exhibits a relatively large restoring force. More specifically, since the body 10A is composed of the spirally or helically formed strip 11, it is resiliently deformable axially as is the case with a compression coil spring. In addition, the spiral strip 11 constituting the body 10A is held in a slightly axially compressed condition by the coacting engaging portions 12 and 13 engaged with each other. The length of the body 10A is shorter than that of the spiral strip 11 having each coacting engaging portions 12 and 13 not engaged with each other. In other words, the restoring force tending to axially expand the body 10A is resisted by the coacting engaging portions 12 and 13 engaged with each other. With this construction, the axial restoring force is stored in the body 10A, and therefore when the body 10A is compressed axially even slightly, it exhibits a large axial restoring force. The first portion 11a of one turn of the spiral body 10A is spaced from the connective portion 11c of the adjacent turn a distance of d1 as shown in FIG. 2. With this construction, each adjacent turns of the spiral strip 11 is movable toward each other to axially contract the body 10A resiliently. Also, the body 10A exhibits a relatively large restoring force when it is subjected to a bending and a torsion because of its spiral construction.

The tubular end member 10B is made of a rigid material such as metal and a synthetic resin and has an front end being slanted with respect to an axis thereof. The front end surface 15 is slanted toward its tip end 16. The front end of the spiral body 10A is fitted in the proximal end of the end member 10B and fixedly secured thereto.

Figure 8:
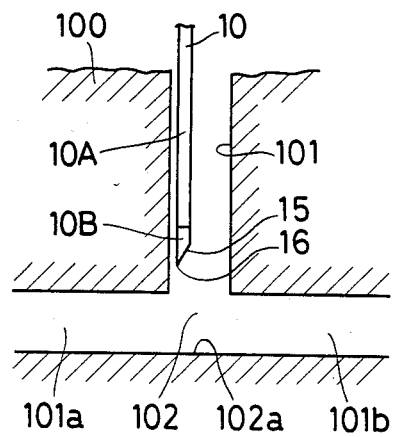
FIGS. 8 to 12 are illustrations showing the operation of the guide tube according to the present invention.

The operation of the guide tube 10 will now be described with reference to FIGS. 8 to 12. As shown in FIG. 8, the guide tube 11 is first inserted into a straight passageway 101 of an object 100 to be inspected. The guide tube 10 is used in the case where the passageway 101 is relatively short. If it is desired to advance the guide tube 11 toward a branch passageway 101a, the guide tube 10 is inserted into the passageway 101 in such a manner that the end surface 15 is directed toward a branch passageway 101b when it reaches a T-shaped branch portion 102. Similarly, the end surface 15 is directed toward the branch passageway 101a if it is desired to advance the guide tube 10 toward the branch passageway 101b.

Figure 9:
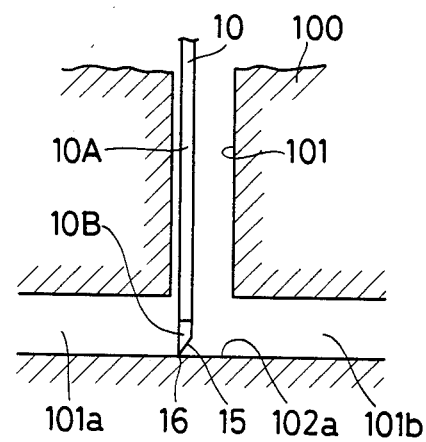
Figure 10:
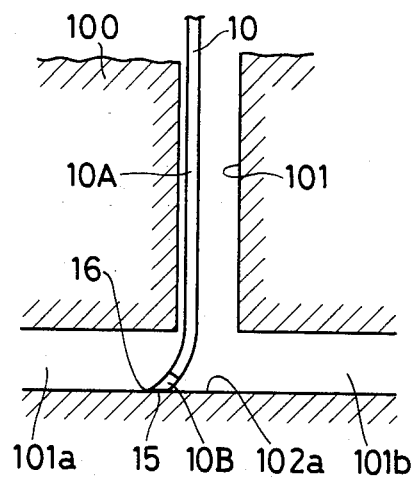
Figure 11:
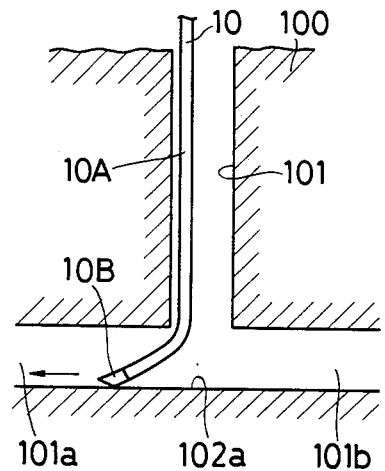

As the guide tube 10 is advanced through the passageway 101, the end member 10B reaches the branch portion 102, and the tip end 16 is brought into contact with that portion of a wall 102a of the T-shaped branch portion 102 disposed in opposed relation to the inner end of the passageway 101, as shown in FIG. 9. Then, the guide tube 10 is further pushed, and therefore the guide tube 10 is axially compressed, so that the front end portion of the body 10A adjacent to the end member 16 is caused to be bent as shown in FIG. 10. Since the slanted end surface 15 faces the branch passageway 101b, the body 10A is bent toward the passageway 101a, and the slanted end surface 15 is brought into contact with the wall 102.

Then, the guide tube 10 is further pushed, and the front end portion of the body 10A adjacent to the end member 10b is further bent to increase its curvature, so that the end surface 15 is held in contact with the wall 102a only at that portion 16a of the edge disposed in diametrically opposed relation to the tip end 16, so that the end member 10B is caused to slide on the wall 102a (FIG. 11) since the friction between the end member 10B and the wall 102a is reduced to the minimum. At this time, since the spiral body 10A is axially compressed, the guide tube 10 is caused to be expanded toward the branch passageway 101a at a stretch under a restoring action thereof.

Figure 12:
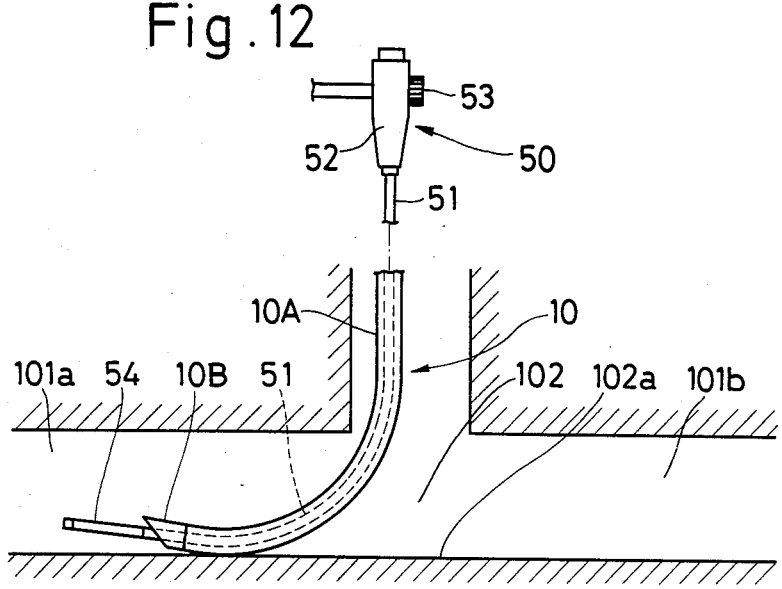
Figure 13:
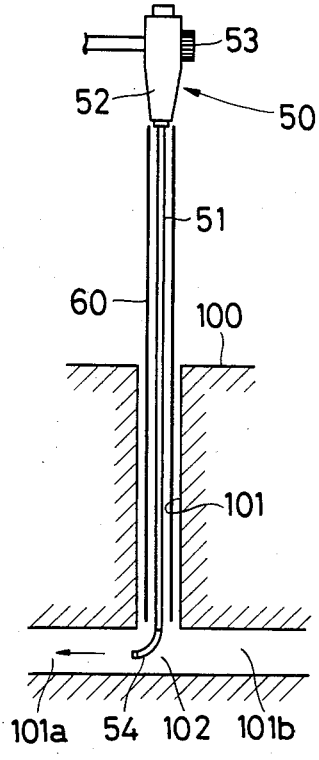
FIGS. 13 to 15 are illustrations showing the operation of a guide tube according to the prior art.
Figure 14:
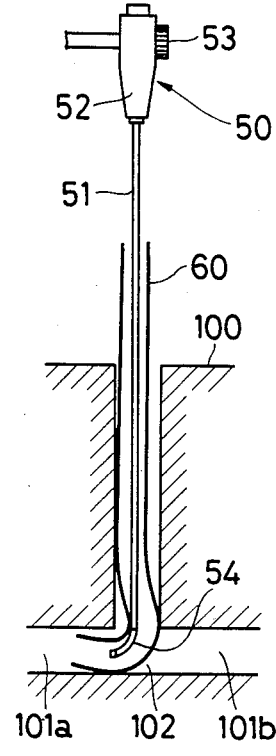
Figure 15:
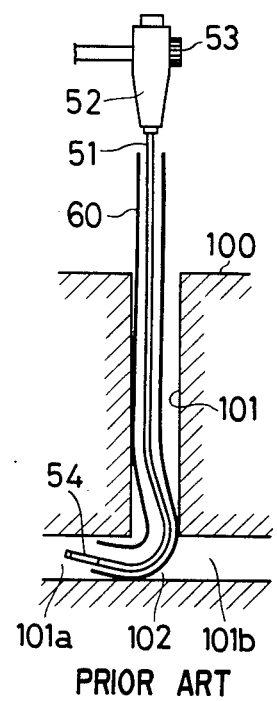

Then, as shown in FIG. 12, an insertion tube 51 of an endoscope 50 is inserted into the guide tube 10 and advanced therealong. Since the guide tube 10 exhibits a large restoring force when it is subjected to a bending, the guide tube 10 is curved at the branch portion 102 with a small curvature, so that the guide tube 10 can smoothly guide the movement of the insertion tube through the branched portion 102.

Figure 3:
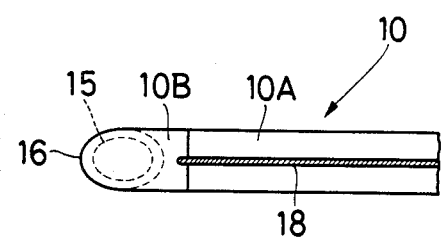
FIG. 3 is a fragmentary side-elevational view of a modified guide tube.

As shown in FIG. 3, the guide tube 10 may have a mark line 18 formed on the outer surface thereof and extending along the axis thereof, the mark line 18 being aligned with the tip end 16. By virtue of the provision of the mark line 18, the operator can easily recognize the direction of the end member 10B in the passageway 101.

FIG. 4 shows a modified end member 10B' which differs from the end member 10B of FIGS. 1 and 2 in that the pointed tip end 16 is removed to provide a tip end surface 15a disposed perpendicular to the axis of the tubular end member 10B'.

FIG. 5 shows another modified end member 10B" which differs from the end member 10B in that the pointed tip end 16 is removed to provide a second slanted end surface 15b. The slanted end surfaces 15 and 15b are slanted toward each other in a direction away from the distal end of the end member 10B".

FIG. 6 shows a modified guide tube 20 which differs from the guide tube 10 of FIGS. 1 and 2 in that a metal strip 21 of a generally corrugated cross-section is formed into a spiral configuration to provide a tubular body 20A. The strip 21 has first and second portions 21a and 21b of a generally L-shape and a connective portion 21c interconnecting the first and second portions 21a and 21b. The strip 21 has a pair of engaging portions 22 and 23 formed along opposite lateral edges thereof, and the engaging portions 22 and 23 of each adjacent turns of the spiral body 20A are engaged with each other. The spiral body 20A is held in a slightly axially compressed condition by the coacting engaging sections 22 and 23 engaged with each other. Therefore, the body 20A exhibits a strong restoring action when it is subjected to axial compression as described above for the body 10A of FIGS. 1 and 2. The engaging portion 23 of one turn of the spiral body 20A is spaced from the connective portion 21c of the adjacent turn a distance of d2, so that each adjacent turns of the spiral body 20A are movable toward each other to axially contract the spiral body 20A resiliently.

FIG. 7 shows another modified guide tube 30 which differs from the guide tube 10 of FIGS. 1 and 2 in that a tubular body 30A comprises an outer tube 33 and an inner spiral tube 32 mounted within the outer tube 33 in a slightly axially compressed condition. More specifically, the outer tube 33 is made of metal mesh, polyester or the like, and has a resistance to elongation but can be bent and compressed axially. The spiral tube 32 is made of a flat metal strip 31 formed into a spiral configuration. A pair of retaining rings 34 and 35 are fitted in and secured to opposite ends of the outer tube 33. The spiral tube 32 mounted in the outer tube 33 is held in a slightly axially compressed condition by the retaining rings 34 and 35. Therefore, the body 30A exhibits a strong restoring force when it is axially compressed because of the provision of the spiral tube 32. Each adjacent turns of the spiral strip 31 are spaced from each other a distance of d3, so that the body 30A is axially contractible resiliently or compressible. The front end of the outer tube 33 and the retaining ring 34 are fixedly secured to the distal end of a tubular end member 10B. The outer tube 33 may have a sufficient resistance to a torsion or twisting in which case the guide tube 30 inserted in the passageway can be angularly moved about its axis by applying a torsional force thereto so as to direct the end member 10B toward a desired direction.

While the guide tubes according to the present invention have been specifically shown and described herein, the invention itself is not to be restricted by the exact showing of the drawings or the description thereof. For example, the guide tube body may be made of a flat metal strip formed into a spiral form and held in a non-compressed condition as is the case with an ordinary coil spring. In this case, each adjacent turns of the spiral strip are spaced from each other, and therefore can be axially compressed. Also, although in the above embodiments, the guide tube bodies are axially compressible along the entire length thereof, they may be modified in such a manner that only the front portion adjacent to the end member is axially compressible.

What is claimed is:

1. A guide tube for guiding the movement of an endoscope into a passageway which comprises a tubular body having:
    a front end slanted with respect to an axis thereof, at least that portion of said tubular body adjacent to said front end being axially compressible resiliently and resiliently bendable, and
    a strip formed into a spiral configuration, each adjacent turns of said spiral strip being movable toward each other a predetermined distance to allow the axial compression of said body, said strip having a pair of first and second engaging portions formed along opposite lateral edges thereof, said first and second engaging portions of each adjacent turns of said spiral strip being engaged with each other in a manner to hold the spiral strip in a slightly axially compressed condition.

2. A guide tube according to claim 1, in which said strip has a generally S-shaped cross-section.

3. A guide tube for guiding the movement of an endoscope into a passageway which comprises a tubular body having:
    a front end slanted with respect to an axis thereof, at least that portion of said tubular body adjacent to said front end being axially compressible resiliently and resiliently bendable,
    an outer tube axially compressible and bendable, and
    a spiral tube mounted within said outer tube and made of a flat strip formed into a spiral configuration, each adjacent turns of said spiral tube being spaced from each other a predetermined distance so as to be movable toward each other to allow the axial compression of said body, said spiral tube being held in a slightly axially compressed condition, and said spiral tube being resiliently bendable.

* * * * *